United States Patent [19]

Duley et al.

[11] Patent Number: 4,933,205

[45] Date of Patent: * Jun. 12, 1990

[54] LASER ETCHING OF FOAM SUBSTRATE

[76] Inventors: Walter W. Duley, 98 McClure Drive, King City, Ontario, Canada, L0G 1K0; Theodore A. Bieler, 314 Mill Street, Richmond Hill, Ontario, Canada, L4C 4B5

[*] Notice: The portion of the term of this patent subsequent to Sep. 6, 2005 has been disclaimed.

[21] Appl. No.: 226,867

[22] Filed: Aug. 1, 1988

Related U.S. Application Data

[63] Continuation-in-part of Ser. No. 106,279, Oct. 9, 1987, Pat. No. 4,769,257.

[51] Int. Cl.$^5$ .................. B05D 3/06; B44C 1/22; B61F 15/22; G03C 11/12

[52] U.S. Cl. .................. 427/53.1; 156/632; 156/643; 156/655; 277/212 C; 277/212 F; 430/258; 430/323

[58] Field of Search ............... 427/53.1; 430/18, 258, 430/292, 297, 323; 156/643, 632, 654, 655; 277/166, 212 R, 212 C, 212 F, 212 FB

[56] References Cited

U.S. PATENT DOCUMENTS

| | | | |
|---|---|---|---|
| 3,003,493 | 10/1961 | Miller | 277/212 |
| 3,112,114 | 11/1963 | Jacobs | 277/212 |
| 3,229,095 | 1/1966 | Lasher et al. | 219/121 LS |
| 3,357,319 | 12/1967 | Hagerty | 277/212 |
| 3,473,000 | 10/1969 | Siekman et al. | |
| 3,569,660 | 3/1971 | Houldcroft | 219/121 |
| 3,604,890 | 9/1971 | Mullaney et al. | 219/121 L |
| 3,663,793 | 5/1972 | Petro et al. | 219/121 LM |
| 3,700,850 | 10/1972 | Lumley et al. | 219/121 LM |
| 3,832,948 | 9/1974 | Barker | 101/401.1 |
| 3,932,726 | 1/1976 | Verheyen et al. | 219/121 L |
| 3,935,419 | 1/1976 | Lambert et al. | 219/121 LM |
| 3,945,825 | 3/1976 | Gale et al. | 430/323 |
| 3,965,327 | 6/1976 | Ehlscheid et al. | 219/121 LM |
| 4,028,523 | 6/1977 | Anderl et al. | 219/121 FM |
| 4,045,318 | 8/1977 | Himics et al. | 427/43.1 |
| 4,087,672 | 5/1978 | Yi | 219/121 LM |
| 4,108,659 | 8/1978 | Dini | 430/292 |
| 4,117,177 | 9/1978 | Schlafer | 427/53 |
| 4,139,409 | 2/1979 | Macken et al. | 156/634 |
| 4,152,575 | 5/1979 | Banas | |
| 4,200,875 | 4/1980 | Galanos | 346/1.1 |
| 4,214,249 | 7/1980 | Kasai et al. | 346/76 |
| 4,288,528 | 9/1981 | Picquendar et al. | 430/297 |
| 4,377,735 | 3/1983 | Minamida et al. | 219/121 LM |
| 4,377,736 | 3/1983 | Daunt et al. | 219/121 LH |
| 4,395,616 | 7/1983 | Smith et al. | 219/121 L |
| 4,408,602 | 10/1983 | Nakajima | 219/121 LS |
| 4,412,231 | 10/1983 | Namba et al. | 346/135.1 |
| 4,414,059 | 11/1983 | Blum et al. | 427/53.1 |
| 4,417,948 | 11/1983 | Mayne-Banton et al. | 427/53.1 |
| 4,454,179 | 6/1984 | Bennett et al. | 427/147 |
| 4,500,771 | 2/1985 | Miller | 219/121 LH |
| 4,535,218 | 8/1985 | Krause et al. | 219/121 LH |
| 4,535,998 | 8/1985 | Katz | 277/212 FB |
| 4,547,649 | 10/1985 | Butt et al. | 219/121 LH |
| 4,578,329 | 3/1986 | Holsappel | 427/53.1 |
| 4,600,686 | 7/1986 | Meyer et al. | 430/323 |
| 4,634,645 | 1/1987 | Matsuda et al. | 430/296 |
| 4,656,079 | 4/1987 | Yamada et al. | 428/209 |
| 4,670,639 | 6/1987 | Behn | |
| 4,707,584 | 11/1987 | Kimbara | 219/121 LS |
| 4,769,257 | 9/1988 | Duley et al. | 427/53.1 |

FOREIGN PATENT DOCUMENTS

| | | |
|---|---|---|
| 0036680 | 9/1981 | European Pat. Off. |
| 3425263 | 1/1985 | Fed. Rep. of Germany |
| 3411797 | 10/1985 | Fed. Rep. of Germany |
| 1050851 | 5/1976 | Japan |
| 2045669 | 3/1979 | United Kingdom |

OTHER PUBLICATIONS

W. W. Duley, Laser Processing and Analysis of Materials, 1983, pp. 69–78.
W. W. Duley, "Laser Material Interactions of Relevance to Metal Surface Treatment", Draper and Mazzoldi (eds.), Laser Surface Treatment of Metals, 1986, pp. 3–16.

Primary Examiner—Norman Morgenstern
Assistant Examiner—Marianne L. Padgett
Attorney, Agent, or Firm—Fleit, Jacobson, Cohn, Price, Holman & Stern

[57] ABSTRACT

A foam plastic substrate has an image formed on its surface by differential ablation by a laser. A composition is applied to the surface in the shape of the image to be formed and has an ablation rate different to that of the foam substrate. After irradiation of the surface, the image is formed in relief on the surface.

7 Claims, 2 Drawing Sheets

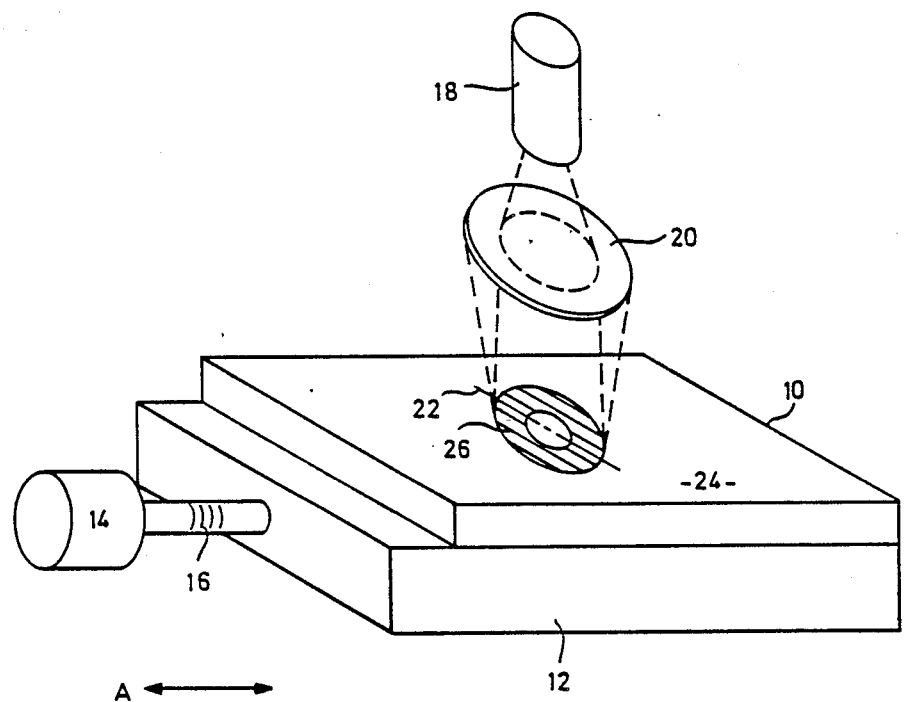
FIG. 1
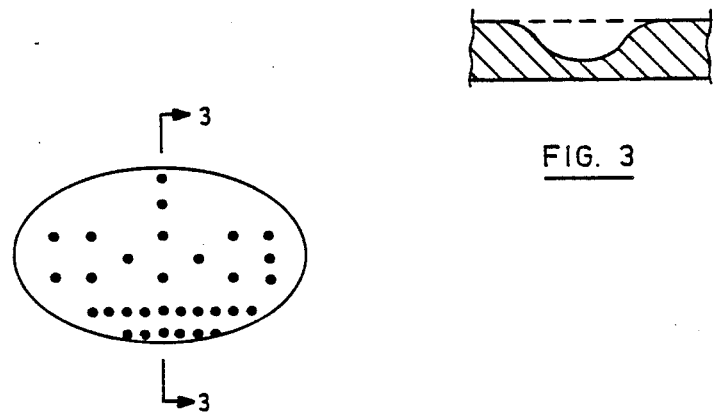
FIG. 3
FIG. 2

LASER ETCHING OF FOAM SUBSTRATE

This application is a continuation-in-part application of U.S. patent application Ser. No. 106,279, filed Oct. 9, 1987, now U.S. Pat. No. 4,769,257, issued Sept. 6, 1988.

The present invention relates to the forming of images on foam plastic material.

BACKGROUND OF THE INVENTION

Foam plastic material is used to an ever-increasing extent in many areas such as containers, graphics art applications and the production of patterns for casting metal structures. It is often desirable to mould the images in relief on the foam, for example on cups, but the production of such images in a mould is costly and requires long runs to be economically viable.

It has previously been proposed in U.S. Pat. No. 4,578,329 to use a laser to mark a foam by "burning" an image on the foam. However, this arrangement requires the laser and/or object to be moved with a great deal of accuracy to reproduce the desired image and therefore complex images are difficult to produce.

Other proposals, such as that shown in U.S. Pat. No. 4,139,409, have utilized a mask to reflect the laser radiation. However, masks are difficult to manufacture and also difficult to apply to curved articles.

SUMMARY

It is therefore an object of the present invention to obviate or mitigate the above disadvantages.

According to the present invention there is provided a method of forming a relief image on a foam plastic substrate ablatable at a predetermined rate by laser radiation comprising the steps of (a) applying to a surface of said substrate a composition having a different ablation rate than said substrate and having a shape corresponding to the shape of said image to be formed, (b) irradiating by scanning whole portions of said surface to ablate said substrate and said composition.

In one embodiment, the image is applied to the surface of the foam substrate by a dry transfer technique so that the image stands out from the substrate after ablation by the laser. Alternatively, the image may be applied by printing.

It has also been found that by utilizing a dot matrix printing process, a three-dimensional contoured effect can be obtained in which the depth is inversely proportional to the density of the dot matrix. In this manner a simple technique is provided for producing three-dimensional images from a two-dimensional photograph.

The above method allows decorative patterns to be formed on the foam substrate. Furthermore, the above method is particularly useful in the formation of gaskets and O-ring seals by coating the foam substrate with the composition in the area to form the gasket so that it can be converted into a raised region via differential ablation. The method can also be used to form customized housings for electronic components and integrated circuits.

BRIEF DESCRIPTION OF THE DRAWINGS

Embodiment of the invention will now be described by way of example only with reference to the accompanying drawings in which FIG. 1 is a schematic representation of the apparatus for forming an image on a foam substrate;

FIG. 2 is a view of a section of a foam substrate produced by an alternative embodiment;

FIG. 3 is a view on the line 3—3 of FIG. 2;

DETAILED DESCRIPTION OF THE INVENTION

Figure 4A:
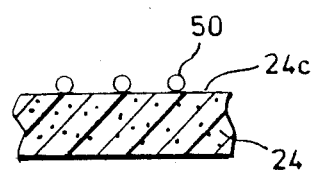
FIGS. 4a and 4b show views of a foam substrate having a water composition thereon before and after irradiation by a laser.

Referring to FIG. 1, a foam plastic substrate indicated at 10 is supported on a table 12 that may be moved in the direction of the arrow A by a stepping motor 14 and screw thread 16. The table 12 is of course supported in any convenient manner to allow incremental movement with the desired degree of accuracy.

Located above the table 12 is a laser 18 to produce a coherent source of radiation. The laser may be of any suitable type such as an Excimer laser sold by Lumonics under the trademark Hyperex. The output of the laser 18 is passed through a lens 20 which produces an elongate line of radiation indicated at 22 at the surface 24 of the substrate 10.

Applied to the surface 24 of substrate 10 is a composition indicated at 26 having a shape corresponding to the shape of the image that is to be formed on the surface 24. The composition 26 has a different ablation rate to that of the foam and is conveniently a dry transfer composition such as that sold under the trademark Letraset. The composition used to define the shapes on the Letraset product is a nitro-cellulose ink deposited on a thin film substrate. The composition 26 is transferred to the surface 24 by simply rubbing the plastic film on which the composition 26 is supported that causes the composition to adhere to the surface 24 and be released from the plastic film. The technique of using such products is believed to be well known and need not be described further.

The foam substrate 10 is a polystyrene foam sold under the trademark Dow Styrofoam H.1.100.

To form the image of the composition 26 in relief, the surface 24 is irradiated by the laser 18 to provide a line of radiation 22 that impinges upon the surface 24. The uncoated foam impinged by the line of radiation is ablated at a faster rate than the composition 26 is ablated. The surface 24 is incrementally moved by the stepping motor 14 so that successive lines on the surface 24 are exposed until the whole of the shape has been scanned. The laser 18 will typically be pulsed between one and three pulses between increments of movement by the stepping motor 14. For the Lumonics Hyperex laser noted above, the energy per pulse is in the order of 0.02-0.5 Joules with a pulse duration of between 10 and 30 nsec. With this configuration. The fluence at the sample surface is between 0.1 and 3 Joules per square centimeter and the resulting etch depth per pulse of the foam is between 0.1 and 3 mm. By contrast, the ablation rate of the ink is $< 10^{-4}$-$10^{-3}$ cm pulse$^{-1}$.

After the desired number of pulses, the motor 14 will step the table 12 between 1 and 5 mm and the irradiation of the surface is repeated.

It will be noted that the above technique does not require the accurate control of the laser or the movement of the substrate to produce the image and permits the composition to be deposited on the surface 24 in a simple and readily available manner.

Satisfactory results have been obtained using an Excimer laser operating at a wavelength of 308 nm using XeCl or at a wavelength of 248 nm using KrF.

However, it should be noted that the overall process is not dependent on the nature of the laser source providing care is taken to choose scan speed and laser power combination carefully. For example, results have been obtained using a continuous wave $CO_2$ laser with a wavelength of 10.6 $\mu$m at an intensity of $\sim$10 watts $cm^{-2}$ to etch polystyrene foam.

Alternative foams could also be used as the substrate 10. Various densities of polystyrene foam, ranging from the high density H.1.100 at 3 lbs/cu.ft. to the lower density buoyancy billet at 1.9 lbs./cu.ft. have been used with satisfactory results. However, the lower density foams tend to have a coarser surface and therefore do not produce such a fine resolution. Alternatively, a commercial product known as bead board could also be used despite its granular surface for larger scale applications.

As an alternative to the dry transfer technique described above, it is also possible to print the composition directly onto the surface of the foam 24. The ink used for printing must of course be compatible with the surface of the foam and for this reason water based ink such as the Hydra Print Ink H.P.000 series available from Ink Dezyne International Limited, Toronto, or a Multi-Purpose Ink H.P.000 series, available from the same manufacturer, has been used successfully. Epoxy based inks and solvent based inks have also been used successfully. With either technique, the composition may have any desired color which may be left on the surface after irradiation.

Surprising results have also been obtained using an image or design prepared in dot matrix or half tone and printed through methods employed in silkscreen printing or other printing techniques. FIG. 2 illustrates a portion of the surface in which an image has been formed by transferring a composition indicated at 26a to the surface 24a as a series of discrete dots. By varying the density of the dots, an image is produced on the surface in a well-known manner having varying grey scale. Satisfactory results have been obtained using a half tone having 36 lines of dots per inch evenly spaced.

A substrate with a shape deposited on it is irradiated by the apparatus shown in FIG. 1 and the untreated foam is ablated at a faster rate than the area covered by the ink. However, a surprising effect is obtained as indicated in FIG. 3 where the depth of ablation is found to be inversely proportional to the density of the dots of composition 26a. As illustrated in FIG. 3, the greater the density of the dots, as illustrated at the lower edge of FIG. 2, the less the removal of the foam so that a contoured effect is produced on the surface of the foam substrate 24. In this manner, a simple mechanism is provided for converting two-dimensional images into three-dimensional relief so that the inverse of the photographic density is converted to a depth of image. Such a technique would be particularly useful in producing topological maps from contour maps in which the contours are shown on a grey scale.

The inks used in the screen printing process illustrated in FIGS. 2 and 3 are the same as those noted above and the irradiation techniques are similar to those described above with respect to FIG. 1.

Again, it is not necessary for the relative movement between the laser and the substrate to be accurately controlled to produce the desired shape on the substrate as the deposition of the composition 26a controls the final shape produced.

When using the above mentioned process with inks or Letrasets, the ink or Letraset may also be applied to the surface of the foam substrate 24 in the form of a material that expands when heated by the laser radiation. This process increases the contrast between the raised image and the ablated foam.

Figure 4B:
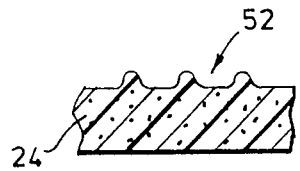

As opposed to using inks or Letrasets, decorative relief patterns may be formed on the foam substrate 24 by applying water droplets 50 to the surface 24c of the foam substrate 24 during irradiation. The water droplets 50 cause the surface of the substrate coated with the water droplets to ablate at a slower rate than the uncoated surface. Thus, the use of the water droplets 50 allows a relief image 52 to be formed on the substrate as shown in FIGS. 4a and 4b.

Figure 5A:
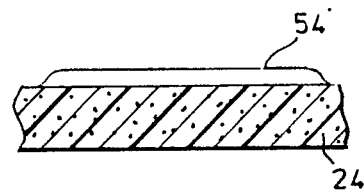
FIGS. 5a and 5b show views of a foam substrate having an alternative composition thereon before and after irradiation by a laser.
Figure 5B:
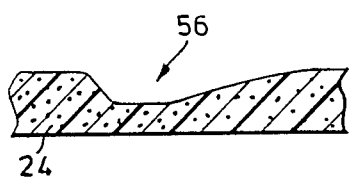

Similarly, by using a liquid such as methanol 54 that evaporates during irradiation by the laser radiation, an image of variable relief 56 can be formed in the foam substrate 24 as illustrated in FIGS. 5a and 5b. Furthermore, if the methanol contains a dye, a coloured image will be formed in the region of the laser etch.

Figure 6A:
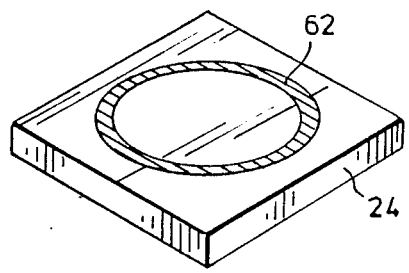
FIGS. 6a and 6b show views of a gasket forming technique.
Figure 6B:
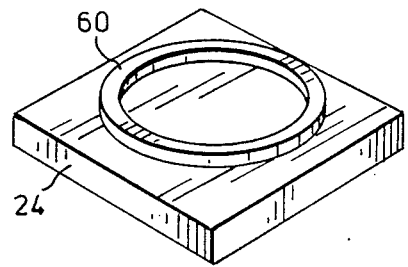

The above mentioned process can be used in other applications other than for forming decorative patterns on the surface of a foam substrate. For example, the process can also be used in the formation of specialized gaskets and O-ring type seals without the need to form a mold. This application is shown in FIGS. 6a and 6b. When forming the gasket or O-ring seal, the gasket or seal can be converted into a raised region 60 on the foam substrate via differential ablation by printing an image 62 of the gasket or seal on the surface of the foam substrate 24 using one of the above mentioned techniques and irradiating the foam substrate with laser radiation. This causes the uncoated portions of the substrate to ablate at a faster rate than the coated portions of the surface thereby resulting in a raised region that can be used as a gasket.

The process can also be used for converting a foam substrate having a printed image thereon into a housing for packaging components. For example, when packaging electronic components and integrated circuits, a printed picture of the components can be used to form a three dimensional housing in the foam substrate using the above mentioned differential ablation technique, since the photographic density of the printed picture is related to the etch depth when using the present technique and hence, the depth of the packaging.

The apparatus shown in FIG. 1 permits a single axis of movement but it will be apparent that multiple axes can be used to obtain similar results. For example, a line focus need not be used but a circular or square cross-section beam could be utilized together with scanning movement about 2 axes in the plane of the substrate.

As an alternative, scanning motion along one axis could be provided by displacement of the beam through an oscillating or rotating mirror with movement of the substrate providing the second axis of scanning. With such an arrangement the laser repetition rate is chosen to match the scanning rate of the beam so that successive repetitions scan the substrate surface.

A further effect can be obtained by adjustment of the beam along its axis to produce varying degrees of focus from "tight" high resolution to "broader" lower resolution.

Adjustment of the beam along its axis is also useful if a contoured surface is to be scanned so that the beam may remain focused on the surface.

In each case it will be noted that to reproduce accurately the desired shape, close control of movement of the beam as it travels across the surface is not required to produce the desired shape on the substrate.

We claim:

1. A method of forming a relief image on a foam plastic substrate ablatable at a predetermined rate by laser radiation comprising the steps of
    (a) applying to a surface of said substrate a composition having a different ablation rate than said substrate and having a shape corresponding to the shape of said image to be formed.
    (b) irradiating by scanning whole portions of said surface to ablate both said substrate and said composition, and
    said composition being applied to said surface in the form of a heat expanding material.

2. A method of forming a relief image on a foam plastic substrate ablatable at a predetermined rate by laser radiation comprising the steps of
    (a) applying to a surface of said substrate a composition having a different ablation rate than said substrate and having a shape corresponding to the shape of said image to be formed,
    (b) irradiating by scanning whole portions of said surface to ablate both said substrate and said composition,
    said plastic substrate being ablatable at a faster rate than said composition, and
    said composition being water.

3. A method of forming a relief image on a foam plastic substrate ablatable at a predetermined rate by laser radiation comprising the steps of
    (a) applying to a surface of said substrate a composition having a different ablation rate than said substrate and having a shape corresponding to the shape of said image to be formed,
    (b) irradiation by scanning whole portions of said surface to ablate both said substrate and said composition,
    said composition evaporating during irradiation to form a variable relief image.

4. A method according to claim 3 wherein said composition is methanol.

5. A method according to claim 3 wherein said composition further includes a dye to form a coloured relief image.

6. A method of forming a gasket on a foam plastic substrate ablatable at a predetermined rate by laser radiation comprising the steps of:
    (a) applying to a surface of said substrate a composition having a slower ablation rate than said substrate and having a shape corresponding to the shape of said gasket to be formed; and
    (b) irradiating by scanning whole portions of said surface to ablate both said substrate and said composition, to form a raised image of said gasket on said surface.

7. A method of forming a housing for a component in a foam plastic substrate ablatable at a predetermined rate by laser radiation comprising the steps of:
    (a) applying to a surface of said substrate a printed picture of said component, said picture having a photographic density dependent on the relief of said component and being formed from a composition having a different ablation rate than said substrate; and
    (b) irradiating by scanning whole portions of said surface to ablate both said substrate and said composition, thereby forming a three dimensional housing for said component.

* * * * *